United States Patent [19]
Kolena et al.

[11] Patent Number: 5,509,716
[45] Date of Patent: Apr. 23, 1996

[54] VEHICLE SEAT WITH PERIMETER FRAME AND PELVIC CATCHER

[75] Inventors: David P. Kolena, Bloomfield Hills; Paul A. Glinski, Chesterfield; Robert S. Crane, Waterford; Mladen Humer, Eastpointe; David C. Viano, Bloomfield Hills; Richard J. Neely, Casco, all of Mich.

[73] Assignee: General Motors Corporation, Detroit, Mich.

[21] Appl. No.: 335,591

[22] Filed: Nov. 8, 1994

[51] Int. Cl.⁶ .................................................. B60R 21/00
[52] U.S. Cl. .............................. 297/216.13; 297/452.18; 297/216.1
[58] Field of Search .................... 297/216.1, 216.13, 297/216.14, 452.18, 452.2, 354.12, 452.53, 452.52

[56] References Cited

U.S. PATENT DOCUMENTS

| | | | |
|---|---|---|---|
| 1,598,468 | 8/1926 | Whall . | |
| 1,684,062 | 9/1928 | Leach et al. . | |
| 2,833,339 | 5/1958 | Liljengren | 155/179 |
| 3,545,808 | 12/1970 | Gescheidle | 297/216 |
| 3,586,376 | 6/1971 | Le Mire | 297/452.2 |
| 4,076,306 | 2/1978 | Satzinger | 297/216 |
| 4,192,545 | 3/1980 | Higuchi et al. | 297/216 |
| 4,249,769 | 2/1981 | Barecki | 296/65 A |
| 4,512,604 | 4/1985 | Maeda et al. | 296/65 A |
| 4,519,650 | 5/1985 | Terada et al. | 297/452 |
| 4,526,423 | 7/1985 | Meinershagen et al. | 297/440 |
| 4,695,097 | 9/1987 | Muraishi | 297/452 |
| 4,796,954 | 1/1989 | Saito | 297/452.2 |
| 4,938,527 | 7/1990 | Schmale et al. | 297/216 |
| 5,044,693 | 9/1991 | Yokota | 297/452 |
| 5,054,845 | 10/1991 | Vogel | 297/216 |
| 5,123,706 | 6/1992 | Granzow et al. | 297/452 |
| 5,129,707 | 7/1992 | Yamauchi | 297/460 |
| 5,290,089 | 3/1994 | Oleszko et al. | 297/216.14 |
| 5,310,247 | 5/1994 | Fujimori et al. | 297/378.12 |
| 5,318,341 | 6/1994 | Griswold et al. | 297/362.11 |
| 5,328,248 | 7/1994 | Nishiyama | 297/452.56 |

FOREIGN PATENT DOCUMENTS

| | | | |
|---|---|---|---|
| 1130717 | 5/1962 | Germany . | |
| 3010662 | 9/1981 | Germany | 297/216.14 |
| 1011411A | 4/1983 | U.S.S.R. . | |

*Primary Examiner*—Milton Nelson, Jr.
*Attorney, Agent, or Firm*—Ernest E. Helms

[57] ABSTRACT

A vehicle seat is providing including a seat bottom frame; a generally U-shaped seat back frame with an upper cross member with legs pivotally mounted with respect to the seat bottom frame, the seat back cross member being generally at least approximately 470 millimeters along a line generally parallel to the torso of a seated occupant from an H point of the seated occupant, and the cross member being concavely bowed if under approximately 525 millimeters from the H point of the seated occupant; and a deformable lower cross member having ends fixably connected to the seat back legs being concavely bowed, the cross member having a major dimension oriented generally parallel to the torso of the seated occupant, the lower cross member having an upper and a lower end, the lower cross member upper end being vertically above the H point of a seated occupant when the seat back frame is positioned in a normal seating position and where in a rear crash situation, the lower cross member deforms to pivot its lower end further away from the seat back frame legs than its top end to capture the seated occupant's pelvic region between the lower cross member and the bottom frame.

6 Claims, 2 Drawing Sheets

VEHICLE SEAT WITH PERIMETER FRAME AND PELVIC CATCHER

FIELD OF THE INVENTION

The field of the present invention is that of vehicle seats, especially recliner vehicle seating.

BACKGROUND OF THE INVENTION

Most efforts in designing vehicle seats for maximum occupant protection have mainly been directed toward protecting the vehicle occupant in frontal crash situations since the vehicle operator is more likely to be involved in a frontal crash situation in an accident. However, lately more attention has been directed in the designing of seats in situations where the occupant's vehicle is struck from the rear. Protection of the vehicle occupant when struck from the rear becomes more challenging when utilizing a recliner seat rather than the typically stiffer, non-recliner seat which was popular in the past. A simple solution to providing more protection to the seat occupant is to increase the thickness and strength of the materials utilized. However, a simple strengthening of the seat is typically unacceptable due to the fact that increased weight diminishes the environmental efficiency of the vehicle.

SUMMARY OF THE INVENTION

The present invention provides a vehicle recliner seat which has a lower cross member in its seat back which is normally in an unnoticeable position but in a crash situation plastically deforms, directing the pelvic region of a seated occupant in a downward motion to capture the pelvic region of a seated occupant between itself and a lower bun frame of the vehicle seat.

DESCRIPTION OF THE PREFERRED EMBODIMENT

Figure 1:
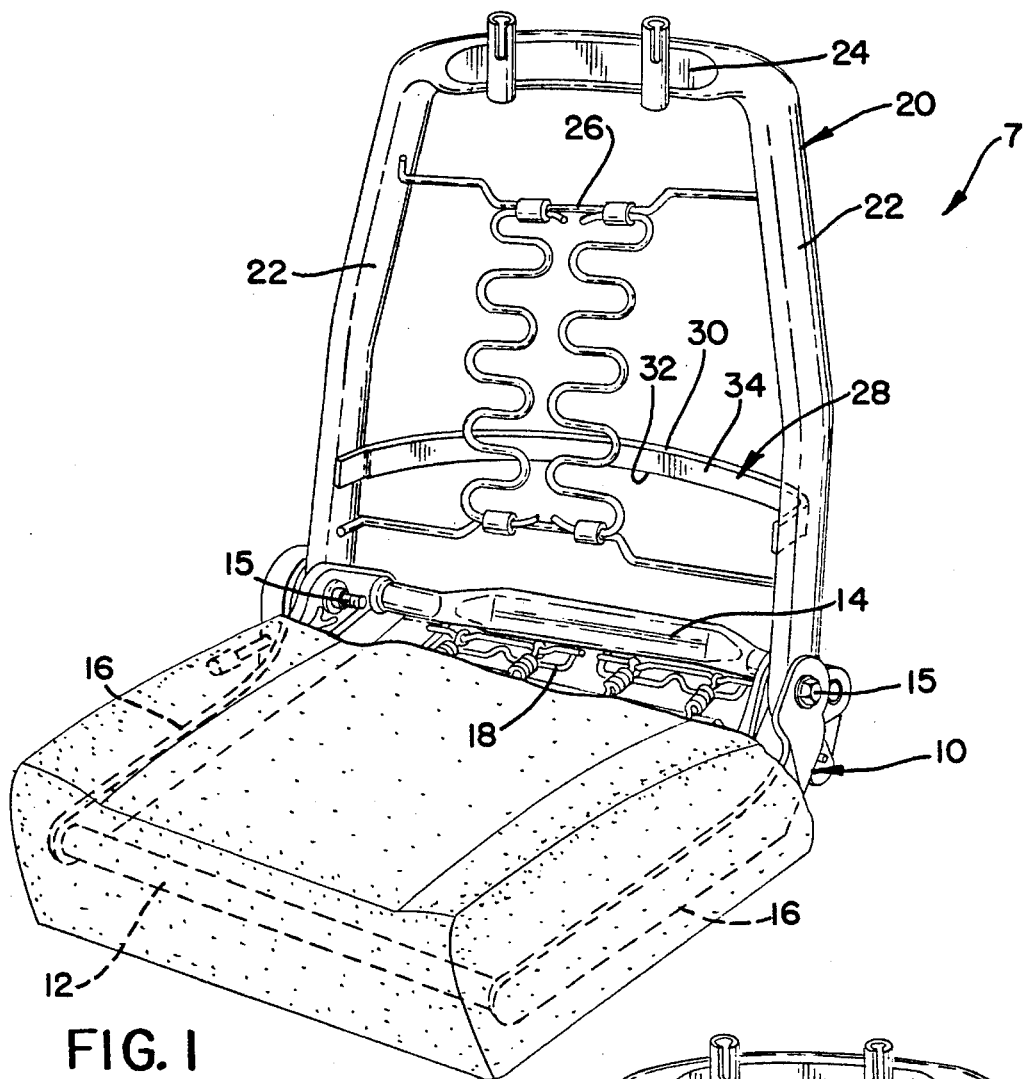
FIG. 1 is a perspective view of a preferred embodiment vehicle seat according to the present invention with portions of the padding and seat covering removed for clarity of illustration.

Referring to FIGS. 1, 3A, 3B and 3C, the preferred embodiment vehicle seat 7 of the present invention has a seat bottom frame 10. Bottom frame 10 has two stamped steel side frame members 16 which are connected by a front cross bar 12 and a rear cross member 14. The front cross member 12 and rear cross member 14 support between a seat suspension 18, which is partially shown. As is well known to those skilled in the art, the lower bottom frame is typically covered with padding and a seat covering material. Along with its suspension, the seat bottom frame 10 provides a platform for support of a thigh and hip, commonly referred to as the pelvic region, of a seated occupant.

Selectively adjustable and pivotally mounted with respect to the seat bottom frame is a generally U-shaped seat back frame 20. The means of adjustment of the seat back frame with respect to the bottom frame 10 can be according to U.S. Pat. Nos. 4,781,415; 4,805,961; 4,824,172 or 4,865,386 or other suitable alternatives.

The seat back frame 20 has two legs 22 which pivot about a pin 15 extending through an aperture provided in the seat pan 10. The seat back frame 20 also has extending between the legs a seat suspension 26, which is normally covered with padding and appropriate cover material. The legs 22 will typically be in a single plane; however, the seat back legs may extend in two different planes in some applications. In a normal seating position, the upper cross member 24 will be at a vertical height 37. Vertical height 37 is defined by a length 41 of at least 470 millimeters from H point 40 (the H point is the center of gravity of the pelvic region of a seated occupant; as shown, it is that of a 95 percentile male) taken along a line 39 which intersects the H point and is generally parallel to line 42. Line 42 provides the angle of the torso of the seated occupant. Typically, the angle of line 42 will differ from that of the legs 22 by only three or four degrees. If the cross member 24 is not at least 525 millimeters above the H point along a line generally parallel to line 42, the cross bar 24 will be concavely bowed (bowed rearwardly with respect to the seat). The purpose of the bowing will be explained later.

Extending rearwardly from the seat suspension and fixably connected to the legs 22 of the seat back 20 by welding or other permanent fastening means is the lower cross member 28. The lower cross member 28 will typically be a rectangular band with a major dimension of at least 25 millimeters, and in the embodiment illustrated, 38 millimeters, but other shapes and constructions are possible in this embodiment. The lower cross member 28 has a top edge 30 and a lower edge 32. The lower cross member 28 is bowed and will extend at least 50 millimeters rearward of the front edge of seat back frame member 20 and at least 100 millimeters rearward of the H point.

The lower cross member 28 will typically be a metal member capable of plastic deformation but yet strong enough to resist rupture in virtually any crash situation. In normal usage of the seat, lower cross member 28 will not be noticeable to the seated occupant.

An early horizontal or downward trajectory of the seated occupant pelvis is provided by a low profile seat cushion frame at the rear. Rear cross member 14 will be positioned rearward 140±20 millimeters of the H point and 125±20 millimeters below the H point 40. The rearward position allows a downward trajectory of the pelvis as cross strap 28 is deformed rearward until contact occurs between the pelvis and rear cross member 14. The engagement of load on rear cross member 14 will occur after the pelvis is trapped by deformation of member 28. If a low profile rear seat cushion frame is not used, a deformable back member will be used to deform rearward under pelvic loading and not to act as a stiff member which promotes an upward motion of the pelvis.

Figure 3A:
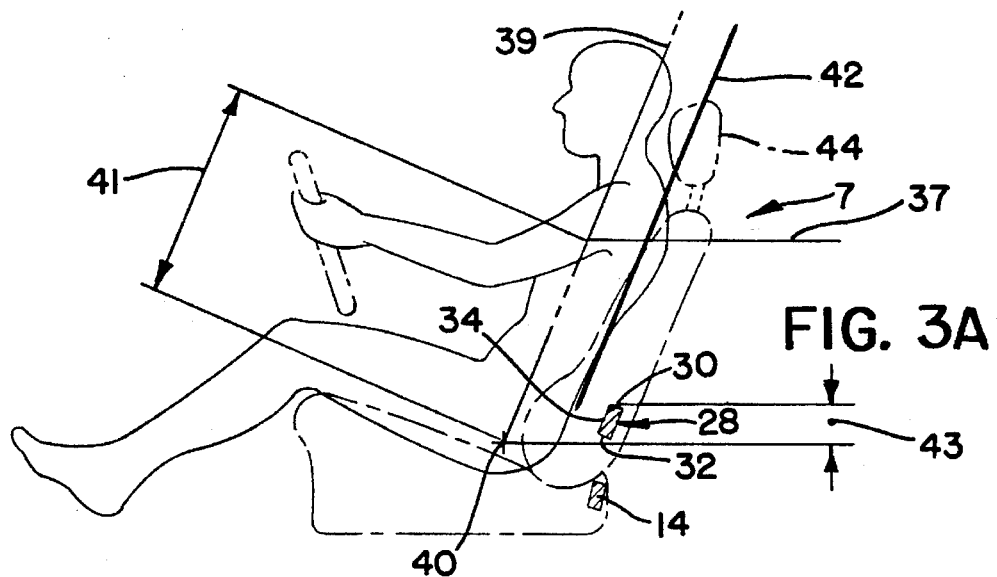
FIGS. 3A, 3B and 3C are schematic views demonstrating operation of the present inventive vehicle seat in a crash situation, capturing the pelvic region of the seated occupant.
Figure 3B:
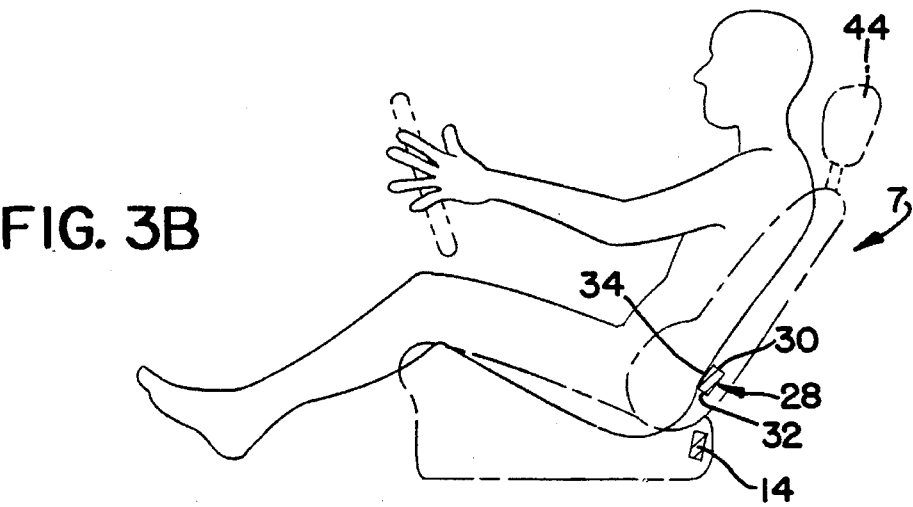
Figure 3C:
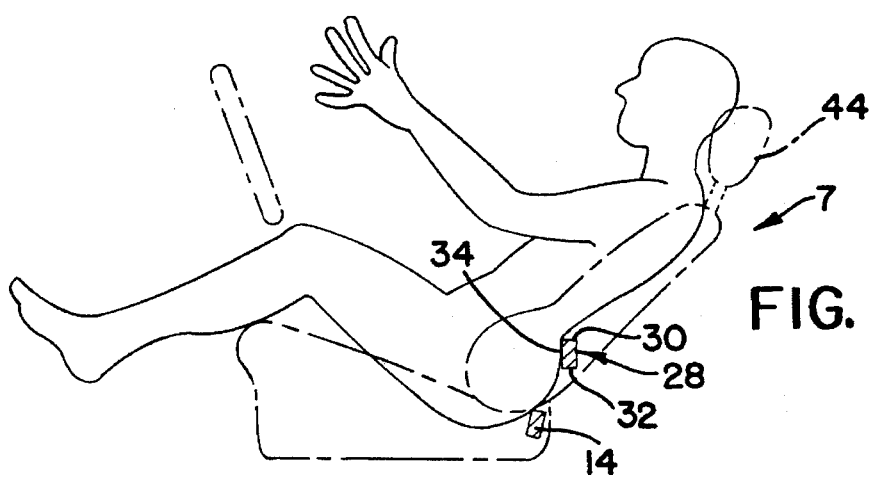

Referring in more detail to FIGS. 3A, 3B and 3C, in a normal situation the top edge 30 of the lower cross member will be 55±20 millimeters in vertical height 43 above the H point 40. If the vehicle is rear loaded in a severe crash situation, the inertia forces acting on the seat will thrust it forward, causing the occupant's pelvis and lower torso to move rearwardly relative to the seat back frame 20. The loading in the crash situation is far in excess of that which can ever be reasonably expected to be absorbed by the seat back suspension 26, and the suspension 26 will flex rearwardly. Since the upper cross member 24 is either bowed or above 525 millimeters, the occupant's body will not initially load the upper cross member 24. Instead, the occupant's pelvic region will begin loading into the lower cross member 28, if a low profile seat cushion does now cause an early upward movement of the pelvis, initiating a ramping occupant motion. The thrust into the lower cross member 28 will cause the lower edge 32 to flex outwardly to bring the major dimension 34 of the lower cross member out of a line generally parallel to the torso of the seated occupant to pivot to approximately 20 to 30 degrees with respect to the seat back legs 22. The flexing and elastic deformation of the lower cross member absorbs energy and also traps the buttocks of the seated occupant between itself and the rearward cross member 14, which is sufficiently rearward and generally low enough so the downward motion of the pelvis by the action of member 28 causes pelvic loading on cross member 14. Loading will be additionally transferred and absorbed by the seat bottom frame 10, which is not part of the reclining seat back frame 20. The lower cross member 28 will typically experience about 40 percent of the total kinetic energy of the seated occupant, with the remainder of the energy being absorbed by the rear cross member 14 of the seat bottom frame 10, the upper cross member 24 (after the loading of the lower cross member 28) and an optional head rest 44.

Figure 2:
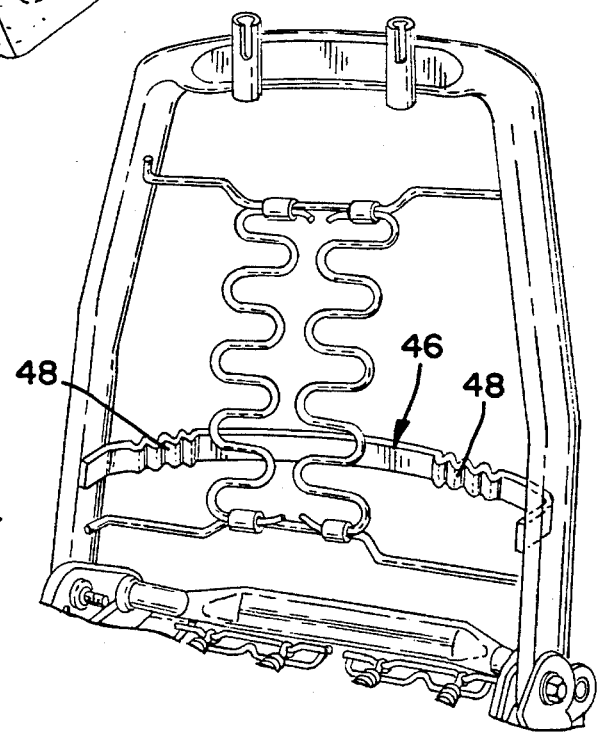
FIG. 2 is a view similar to that of FIG. 1 showing an alternate preferred embodiment of the present invention.

Referring to FIG. 2, an alternate preferred embodiment of the present invention has a cross member 46 with accordion bends 48 for additional absorption of energy during the plastic deformation stage in a crash situation.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A vehicle seat comprising:

a seat bottom frame for providing support of a thigh and pelvic region of a 95 percentile male seated occupant;

a seat back frame, generally U-shaped, with an upper cross member with legs being selectively adjustably pivotally mounted with respect to the seat bottom frame, the seat back frame legs supporting a seat back suspension therebetween for supporting a torso region of the seated occupant, the upper cross member oriented to be at a vertical height generally at least approximately 470 millimeters along a line generally parallel to the torso of the seated occupant from an H point of the seated occupant, and the upper cross member oriented to be concavely bowed toward a front end of the seat when the upper cross member is under a height of approximately 525 millimeters from the H point of the seated occupant along a line generally parallel to the torso line of the seated occupant and a plastically deformable lower cross member having ends fixably connected to the seat back frame legs and being, toward the front end of the seat, concavely bowed, the lower cross member having a major dimension oriented to be generally parallel to the torso of the seated occupant and having a major dimension length of approximately at least 25 millimeters, the lower cross member having an upper and a lower end, the lower cross member upper end oriented to be vertically above the H point of the seated occupant at a distance of 55±20 millimeters when the seat back frame is positioned, in a normal seating position and where in a crash situation when the seat back frame is excessively loaded rearwardly, the lower cross member deforms to pivot its lower end further away from the seat back frame legs than its top end to capture the seated occupant's pelvic region between the lower cross member and the bottom frame.

2. A vehicle seat as described in claim 1 wherein the lower cross member is approximately 38 millimeters in its major dimension length.

3. A vehicle seat as described in claim 1 wherein the lower cross member has accordion bends to absorb energy during the deformation in a crash situation.

4. A vehicle seat as described in claim 1 wherein the seat bottom frame has a rearward cross member which is adapted to be loaded in the crash situation by the pelvic region when the pelvic region is trapped by the seat back lower cross member.

5. A vehicle seat as described in claim 4 wherein the seat bottom frame rearward cross member is oriented to be 140±20 millimeters rearward of and 125± 20 millimeters below the H point.

6. A vehicle seat as described in claim 4 wherein the seat bottom rearward cross member is sufficiently deformable rearwardly so as not to promote any early upward trajectory of the seat occupant H point in the crash situation.

\* \* \* \* \*